Patented Jan. 18, 1944

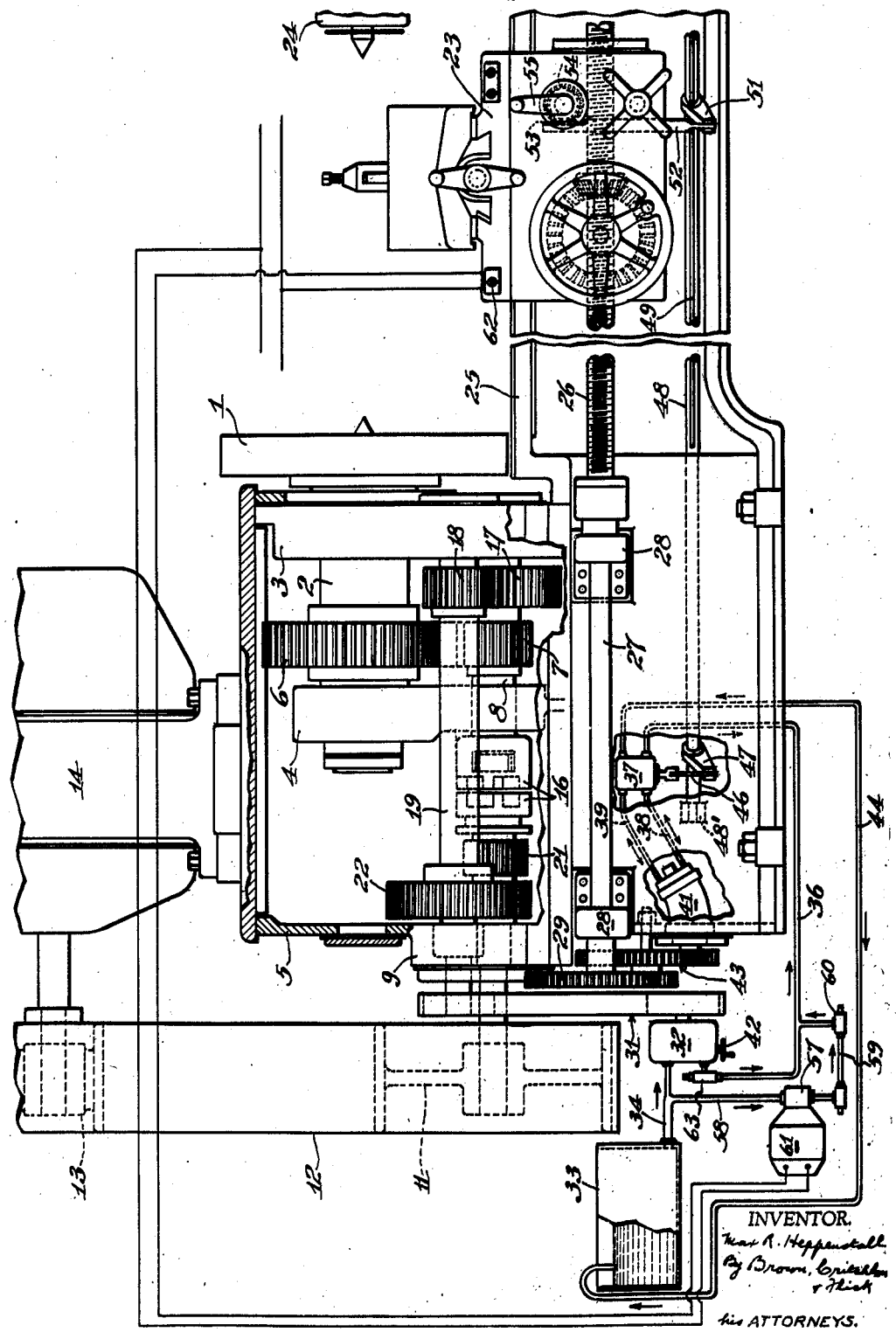

2,339,400

UNITED STATES PATENT OFFICE 2,339,400

LATHE

Max R. Heppenstall, Pittsburgh, Pa., assignor to Heppenstall Company, Pittsburgh, Pa., a corporation of Pennsylvania Application January 15, 1941, Serial No. 374,495

3 Claims. (Cl. 82—2)

This invention relates to lathes, and more particularly to the drives for what are known as roughing lathes, used generally for taking heavy cuts on shafts and the like.

Heretofore it has been the general practice to move the tool-supporting carriage of a lathe along the workpiece by means of a mechanical drive positively geared to and driven by the drive by which the lathe headstock is rotated. Provision has been made for changing the ratio between the carriage and headstock speeds in a few fixed steps, but in so far as I know, it has not been possible previously without gear change to vary the speed ratio infinitely in each direction within predetermined limits. A carriage drive that will permit the carriage to be moved at any desired speed is often highly desirable because the cutting tool should be moved at different speeds for workpieces of different characteristics in order to obtain the best cutting conditions and efficiency.

It is the general object of this invention to provide a lathe in which the tool-supporting carriage may be driven at speeds that are infinitely variable relative to the rotation of the headstock, and in which the rate of movement of the carriage in either direction may be quickly increased at will above its normal speeds. More specific objects will appear in the ensuing description of the invention.

In accordance with this invention a lathe is provided with the usual headstock and tailstock between which a tool-supporting carriage is movable by means of a screw or the like. The headstock is driven from a suitable source of power at predetermined speeds. The carriage-moving means is driven from the headstock drive by an infinitely variable speed drive, preferably hydraulic, as a result of which the tool can be moved along the workpiece at any desired speed with relation to the rotation of the headstock. The hydraulic drive is preferably provided with an auxiliary or booster pump which can be operated when desired in order greatly to increase the speed of the tool carriage, such as when it is wished to move the carriage from one end of the lathe toward the other while the tool is not in engagement with the workpiece, either in the forward or reverse direction.

The preferred embodiment of the invention is illustrated in the accompanying drawing which shows a side elevation of my lathe, partly in vertical section, with the hydraulic drive for the tool carriage illustrated somewhat diagrammatically, and in part perspectively.

Referring to the drawing, a headstock is formed by a face-plate 1 rigidly mounted on the outer end of a horizontal spindle 2 that is journaled in front and intermediate bearings 3 and 4 in a housing 5. Mounted on the spindle between the bearings is a gear 6 which is driven by a pinion 7 on a main shaft 8 journaled in bearings 3 and 4 and also in a rear bearing 9 through which the shaft extends from the housing. The projecting end of the shaft carries a pulley 11 around which a belt 12 passes from a pulley 13 on the shaft of an electric motor 14 mounted on the housing. Main shaft 8 is provided with a clutch 16, and the front end of this shaft also carries a gear 17 which drives a pinion 18 on another shaft 19 journaled in front bearing 3 and rear bearing 9 from which it projects. The speed of the headstock can be changed by disengaging clutch 16 and by moving a pinion 21 along the main shaft, on which it is splined, until it meshes with a gear 22 on shaft 19. This drives pinion 18 which in turn drives gear 17 and the headstock.

As is the customary practice, shaft 19 drives the mechanism by which the carriage 23 for the cutting tool (not shown) is moved along the workpiece supported by the headstock and the tailstock 24, but in a new and improved manner that will be described presently. The carriage slides on horizontal ways 25 extending from the headstock to the tailstock, and has a downwardly extending side portion through which a threaded horizontal shaft 26 extends in threaded engagement therewith. The rear end of this shaft is coupled to an unthreaded shaft 27 journaled in bearings 28 located below housing 5. Shaft 27 is rotated from its rear end by a gear 29. This rotates the threaded shaft and thereby causes the tool carriage to move toward or away from the headstock.

It is a feature of this invention that the rate of movement or feed of the tool carriage along the workpiece is not dependent upon the speed of rotation of the headstock. On the contrary, the speed of the tool is infinitely variable within predetermined limits so that the tool can be moved at any desired speed per revolution of the headstock. Also, the selected ratio of feed to revolution of the headstock is automatically maintained for various headstock speeds. Accordingly, the headstock drive is operatively connected to gear 29 on the end of carriage drive shaft 27 through the medium of an infinitely-variable speed hydraulic drive.

More specifically, the projecting end of shaft 19 in housing 5 is connected by a belt and pulley drive 31 to the operating shaft of an hydraulic pump 32. This pump draws a fluid, such as oil, from a reservoir 33 through a conduit 34 and pumps the oil through a main conduit 36, a three-way valve 37 and either conduit 38 or 39 to an hydraulic motor 41. The quantity of oil delivered by the pump per unit of time to the motor determines its speed, and the oil output of the pump can be infinitely varied by turning a hand wheel 42 that changes the length of stroke of the pistons in the pump. Variable output fluid pumps of this character are well known and need not be described further. As the volume of oil delivered by the pump is in direct proportion to its speed, and as the pump is driven directly by the headstock drive, the feed of the carriage is changed when the headstock speed is changed, and thereby the speed ratio is maintained unless changed by turning hand wheel 42.

The hydraulic motor drives gear 29 through a train of gears 43, and therefore the carriage can be moved at a speed that is infinitely variable. The oil leaves the motor through either conduit 38 or 39 and the three-way valve from which it flows through a return conduit 44 back to the reservoir. When the three-way valve, which is of well known construction, is in one of its positions oil is pumped into the hydraulic motor through conduit 38 and escapes from it through conduit 39, thus rotating the screw shaft in one direction. When the valve is reversed, oil flows into the motor through conduit 39 and out through conduit 38, and the screw shaft is thereby rotated in the opposite direction. Midway between these two positions the valve shuts off conduits 38 and 39 and short circuits the oil from the pump through itself and back to the reservoir. At such times the hydraulic motor and tool carriage are idle.

To permit the valve to be shifted from one of its positions to another, it is connected by a link 46 to an arm 47 rigidly mounted on a rod 48 rotatably mounted at its ends in bearings 48' below carriage moving shafts 26 and 27. The portion of the rod below carriage supporting ways 25 is provided with a longitudinal groove 49, and splined on this portion of the shaft is an arm 51 which is pivotally connected to the lower end of a bar 52 whose upper end is provided with rack teeth 53. These teeth are engaged by a gear 54 rotatably supported by the carriage and which can be turned by a handle 55. When the handle is turned by the operator of the lathe, bar 52 rotates rod 48 and thereby moves the valve to one of its three positions, as desired. This simple carriage control also does away with heavy friction or mechanical clutches.

Another feature of this invention is that the speed of the tool carriage can be quickly increased above that at which the hydraulic drive is normally capable of moving the carriage, and without changing the setting of the hydraulic pump. Such rapid movement of the carriage is desirable when the tool is not engaging the workpiece and it is wished to move the carriage. For this purpose an auxiliary or booster pump 57 is connected in the fluid circuit of the hydraulic drive. This pump is connected by a conduit 58 to conduit 34 leading from the oil reservoir to the main pump 32, and by another conduit 59 to main conduit 36. In conduit 59 there is a check valve 60 so that when the booster pump is not operating, the main pump will not pump oil back through it. The booster pump is operated by an electric motor 61 which is connected by an electric circuit to a push button switch 62 mounted on the tool carriage. As long as this push button is depressed, the booster pump will operate and the carriage will move rapidly along screw shaft 26, but when the push button is released the booster pump stops and the carriage then depends for its rate of movement upon the setting of the main pump.

If the tool carriage is carelessly run against a shoulder on the workpiece, or against the tailstock, no serious mechanical damage will result, because a relief valve 63 with which the main pump is provided will release the fluid pressure.

It will thus be understood that although the drive for the tool carriage of my lathe depends for its power upon the headstock drive, the rate of movement of the carriage is not controlled by the speed of the headstock. While the headstock is operating at a uniform speed the carriage can be moved along the workpiece at any speed desired. It is therefore possible to move the tool along any given workpiece at the optimum speed for proper cutting of that particular workpiece. Due to the booster pump an undue amount of time is not lost when it becomes necessary to shift the tool carriage while no work is being done on a workpiece.

According to the provisions of the patent statutes, I have explained the principle and mode of operation of my invention and have illustrated and described what I now consider to represent its best embodiments. However, I desire to have it understood that, within the scope of the appended claims the invention may be practiced otherwise than as specifically illustrated and described.

I claim:

1. A lathe comprising a headstock, a drive shaft, a motor for driving said shaft, a driven shaft operatively connected to the headstock for rotating it and having a constant speed ratio to the headstock, adjustable mechanical means for driving the driven shaft from the drive shaft selectively at different speed ratios, a tool carriage movable toward and away from the headstock, a screw for driving the carriage, an hydraulic motor for rotating the screw, an hydraulic pump for driving the hydraulic motor, mechanical means for driving the pump from said driven shaft whereby the speed ratio between the headstock and pump remains constant when the speed ratio between the driven shaft and drive shaft is changed by said adjustable mechanical means, and means for infinitely varying the fluid output of the pump so that the hydraulic motor can be driven at any desired speed relative to the headstock speed.

2. A lathe comprising a rotatable spindle, a face-plate mounted on one end of the spindle, a drive shaft, a motor for driving said shaft, a second shaft beside the drive shaft, gears connecting said second shaft with the spindle so that the second shaft has a constant speed ratio to the face-plate, adjustable means for driving the second shaft from the drive shaft selectively at different speed ratios, a tool carriage movable toward and away from the face-plate, a manually adjustable infinitely-variable speed drive for moving said carriage at any desired speed relative to the face-plate speed, and means for driving the infinitely-variable speed drive from said second shaft whereby the speed ratio between the face-plate and infinitely-variable speed drive remains constant when the speed ratio between said second shaft and drive shaft is changed by said adjustable means.

3. A lathe comprising a rotatable spindle, a face-plate mounted on one end of the spindle, a two-part drive shaft, a clutch for operatively connecting and disconnecting said two parts, gears directly connecting one of said parts to the spindle, a motor for driving the other of said parts, a second shaft beside the drive shaft, gears directly connecting said second shaft to said one part of the drive shaft, gears for connecting the other part of the drive shaft to said second shaft when the clutch is disengaged for changing the speed ratio between the two shafts, a tool carriage movable toward and away from the face-plate, a screw for driving the carriage, an hydraulic motor for rotating the screw, an hydraulic pump for driving the hydraulic motor, mechanical means for driving the pump from said second shaft whereby the speed ratio between the face-plate and pump remains constant when the speed ratio between said second shaft and drive shaft is changed, and means for infinitely varying the fluid output of the pump so that the hydraulic motor can be driven at any desired speed relative to the face-plate speed.

MAX R. HEPPENSTALL.